US012668475B2

(12) United States Patent
Schoenfelder

(10) Patent No.: US 12,668,475 B2
(45) Date of Patent: Jun. 30, 2026

(54) APPARATUS FOR APPLYING A CONTAINER CLOSURE TO A CONTAINER, AND CLOSER

(71) Applicant: KRONES AG, Neutraubling (DE)

(72) Inventor: Markus Schoenfelder, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 19/040,533

(22) Filed: Jan. 29, 2025

(65) Prior Publication Data

US 2025/0243044 A1 Jul. 31, 2025

(30) Foreign Application Priority Data

Jan. 30, 2024 (DE) ..................... 10 2024 102 536.0

(51) Int. Cl.
*B67B 3/00* (2006.01)
*B67B 3/06* (2006.01)

(52) U.S. Cl.
CPC ..................................... *B67B 3/06* (2013.01)

(58) Field of Classification Search
CPC .... B67B 3/06; B67B 3/18; B67B 3/20; B67B 3/2033; B67B 3/26; B67B 3/2053; B67B 3/2066; B67B 3/268; B67B 3/0645
USPC ........ 53/331, 331.5, 64, 307, 317, 381.4, 77
See application file for complete search history.

(56) References Cited

U.S. PATENT DOCUMENTS 5,284,001 A * 2/1994 Ochs ....................... B67B 3/268
53/317

FOREIGN PATENT DOCUMENTS

DE 10 2012 219 756 A1 4/2014
WO WO 2014 044351 A1 3/2014
WO WO-2022058032 A1 * 3/2022 ............. B21D 51/30

OTHER PUBLICATIONS

Search Report dated Dec. 3, 2024, from German Application No. 10 2024 102 536.0, 6 pages.

* cited by examiner

*Primary Examiner* — Jacob A Smith
(74) *Attorney, Agent, or Firm* — Haynes and Boone, LLP

(57) ABSTRACT

An apparatus for applying a container closure to a container, for example for applying a can lid to a can, for example in a beverage filling plant, includes an application unit having a closure receptacle for receiving a container closure, and an ejector unit movable relative to the application unit for ejecting a container closure received in the closure receptacle, wherein an ejector part, for example in the form of an ejector screen, which comes into physical contact with the container closure, for ejecting the container closure is arranged on the ejector unit on its side facing the closure receptacle, wherein the ejector part is detachably attached to the ejector unit via a quick-coupling mechanism. A closer including the apparatus is also described.

20 Claims, 2 Drawing Sheets

APPARATUS FOR APPLYING A CONTAINER CLOSURE TO A CONTAINER, AND CLOSER

CROSS-REFERENCE TO RELATED APPLICATIONS

This application claims priority from German Patent Application No. DE 10 2024 102 536.0, filed on Jan. 30, 2024 in the German Patent and Trademark Office, the disclosure of which is incorporated herein by reference in its entirety.

BACKGROUND

Technical Field

The present invention relates to an apparatus for applying a container closure to a container, for example for applying a can lid to a can, for example in a beverage filling plant, and to a closer comprising such an apparatus for closing containers with a container closure, for example for closing a can with a can lid.

Related Art

In filling plants in which a filling product is filled into a container that is then closed with a container closure, closers are used to close containers with a container closure, for example to close cans with a can lid. These closers comprise a transport unit having a plurality of container holders, each of which is configured to receive a container to be closed. Each container holder is assigned an apparatus for applying a container closure to a container. The apparatus receives a container closure and applies it to the container to be closed. The apparatus for applying a container closure to a container is also referred to as a "closer head."

The closer can be configured as a rotary-type closer. The transport unit then has the form of a carousel that can be rotated about a central axis of rotation, on the circumference of which the apparatuses or, synonymously, closer heads are arranged in an evenly distributed manner. Alternatively, the transport unit can also be configured, at least in part, for linear conveyance of the containers received in the container receptacles.

During operation, it is possible that a container closure was not been properly applied to the container to be closed and that it remains in the closure receptacle of the apparatus. In order to ensure that the closure receptacle is not blocked by the remaining container closure at the takeover position, at which the closure receptacle is to take over a new closure, and that it does not disturb proper operation of the closer, the apparatus can have an ejector rod which pushes the container closure remaining in the closure receptacle out of the closure receptacle.

Such an ejector rod can comprise an ejector part, for example in the form of an ejector shield when processing cans, the shape of which is adapted to the shape of the container closure to be processed and which comes into physical contact with the container closure when the latter is ejected. It is known to fasten the ejector part to the ejector unit with a nut. Before fastening the ejector part, the ejector rods are brought to the same height position by trimming them, once they have been mounted on the transport unit. The ejector parts are then fastened to the ejector rods.

If containers or cans of a different type are to be processed in the filling plant and/or if new can lids with a different thickness are to be processed, it is necessary to change the machine settings, in particular the closer. For this purpose, each apparatus on the closer must be individually readjusted and the ejector parts must be replaced, which is a time-consuming process.

Accordingly, a setup change or format adjustment results in great assembly effort and long downtimes.

SUMMARY

An improved apparatus for applying a container closure to a container, for example for applying a can lid to a can, for example in a beverage filling plant, and a corresponding closer are described herein according to various embodiments of the present disclosure.

Accordingly, what is proposed is an apparatus for applying a container closure to a container, for example for applying a can lid to a can, for example in a beverage filling plant. The apparatus comprises an application unit having a closure receptacle for receiving a container closure, and an ejector unit movable relative to the application unit for ejecting a container closure received in the closure receptacle, wherein an ejector part, for example in the form of an ejector shield, which comes into physical contact with the container closure, for ejecting the container closure is arranged on the ejector unit on its side facing the closure receptacle.

The application unit can also be referred to as a "seaming head," since applying the lid to a can may be done by seaming and flanging the metal of the lid with the metal of the can body.

The ejector part is detachably attached to the ejector unit via a quick-coupling mechanism. As a result, the ejector part can be detached from the ejector unit or attached to the application unit in a comparatively short time, i.e., compared to the prior art, and without the need for a tool. Accordingly, worn ejector parts can be replaced in a comparatively short time. Analogously, the apparatus can be retooled from processing one type of container closure to another type of container closure in a comparatively short time and in a simple manner.

The resulting comparatively quick and easy dismounting and mounting of the ejector part also allows the seaming head or the closure receptacle to be changed without great time and technical effort, without the ejector part hindering or even blocking this process. This is because the ejector part can be quickly removed using the quick-coupling mechanism, so that the closure removal can be replaced without any great delay, and without an ejector part on the apparatus hindering said retooling.

According to one embodiment, the quick-coupling mechanism can comprise a coupling part fastened to the ejector unit to which the ejector part is detachably coupled. As a result, the quick-coupling mechanism can be provided on the ejector unit in a simple manner.

According to one embodiment, a position of the coupling part can be adjustable relative to the ejector unit. In this way, the height position of the ejector part can be precisely adjusted without any other length adjustment of the ejector unit, for example trimming of an ejector rod of the ejector unit, being necessary. Mechanical processing of the ejector unit can therefore be dispensed with.

The position of the coupling part relative to the ejector unit can be adjusted, for example by positioning a predetermined number of shims, for example washers, between the coupling part and the ejector unit.

The shims have a predetermined thickness. The thickness of the shims used may vary. For example, shims of different thickness can be provided, which are selected together in such a way that the intended height position of the ejector part is as close as possible to the mathematically ideal height position, or corresponds thereto.

The ejector unit and the coupling part can have correspondingly configured stop surfaces which are oriented transversely to a mounting direction in which the coupling part is mounted, for example stretched and/or screwed, to the ejector unit. The predetermined number of shims can be arranged between said stop surfaces.

In this document, a "predetermined number" is understood to mean a quantity from zero to a plurality. For example, the predetermined number can be zero, i.e., no shims, one shim, two shims, etc.

In this document, the "height position" corresponds to the position of the ejector part in relation to a direction of movement of the application unit and/or a normal to the transport direction of a transport unit of a closer comprising the apparatus and/or the direction of gravity which the ejector part has when the apparatus is properly attached to the transport unit.

According to one embodiment, the ejector part can comprise a coupling groove for receiving at least one detent body, for example a detent ball. The ejector part can be fastened to the ejector unit via the detent body or detent bodies.

The coupling part can comprise a detent body receptacle for receiving at least one detent body, wherein an actuating part that is movable relative to the coupling part between a detent position and a release position can be arranged on the coupling part, wherein, in the detent position, the actuating part fixes the at least one detent body in a detent position, in which the at least one detent body forms a positive connection between the ejector part and the coupling part, and wherein, in the release position, the at least one detent body can disengage from the ejector part. Alternatively, the actuating part can also be arranged on the ejector part so that it can move relative to the ejector part.

Optionally, the actuating part can be biased into the detent position.

In this document, "receiving" means that a body, for example the detent body, is at least partially surrounded by the receptacle in which it is "received." In other words, a "received body" is physically located with at least part of its total volume within the volume of the receptacle that "receives" the body.

According to one embodiment, the ejector unit can comprise the at least one detent body receptacle for receiving at least one detent body. In other words, the coupling part is then not formed as a separate component, but by a component of the application unit or by the application unit. Accordingly, an actuating part that can be moved relative to the application unit between a detent position and a release position can also be arranged directly on the ejector unit. In the detent position, the actuating part can optionally fix the at least one detent body in a detent position, in which the at least one detent body forms a positive connection between the ejector unit and the ejector part. Furthermore, the at least one detent body can disengage from the ejector part in the release position. Optionally, the actuating part is biased into the detent position. The at least one detent body receptacle part of the ejector unit then constitutes the coupling part.

A closer for closing containers with a container closure, for example for closing cans with a can lid, for example in a beverage filling plant is also described herein.

Accordingly, a closer for closing containers with a container closure, for example for closing cans with a can lid, for example in a beverage filling plant, is proposed, comprising a container holder for holding an unsealed and filled container, for example in the form of a can holder for holding an unsealed and filled can, and an apparatus associated with the container holder according to any of the preceding embodiments.

The advantages and effects described with regard to the apparatus can also be achieved by means of the closer. A repeated description of them is therefore omitted in order to avoid redundancies.

According to one embodiment, the apparatus can be arranged on a transport unit that is movable in a transport direction, and the closer can further comprise a fixed guide curve for specifying the position of the ejector unit relative to the container receptacle, wherein the guide curve is configured to be height-adjustable in the direction of movement of the ejector unit.

Since the height of the guide curve can be adjusted, the height position of the ejector part of the apparatus of the closer can be quickly, reproducibly and precisely adjusted to the container type being processed and/or the container closure to be processed.

If the closer comprises a plurality of apparatuses, the height adjustability of the guide curve allows for the height position of the ejector part of all apparatuses to be simultaneously adjusted to the container type being processed and/or the container closure to be processed.

Accordingly, a fine adjustment of the height position of all ejector parts can be achieved simultaneously.

BRIEF DESCRIPTION OF THE FIGURES

Advantageous further embodiments of the invention are explained in more detail by the following description of the figures, in which.

DETAILED DESCRIPTION

Advantageous exemplary embodiments are described below with reference to the figures. Identical, similar, or identically acting elements are provided with identical reference signs in the various figures, and a repeated description of these elements is in some cases omitted in order to avoid redundancies.

Figure 1:
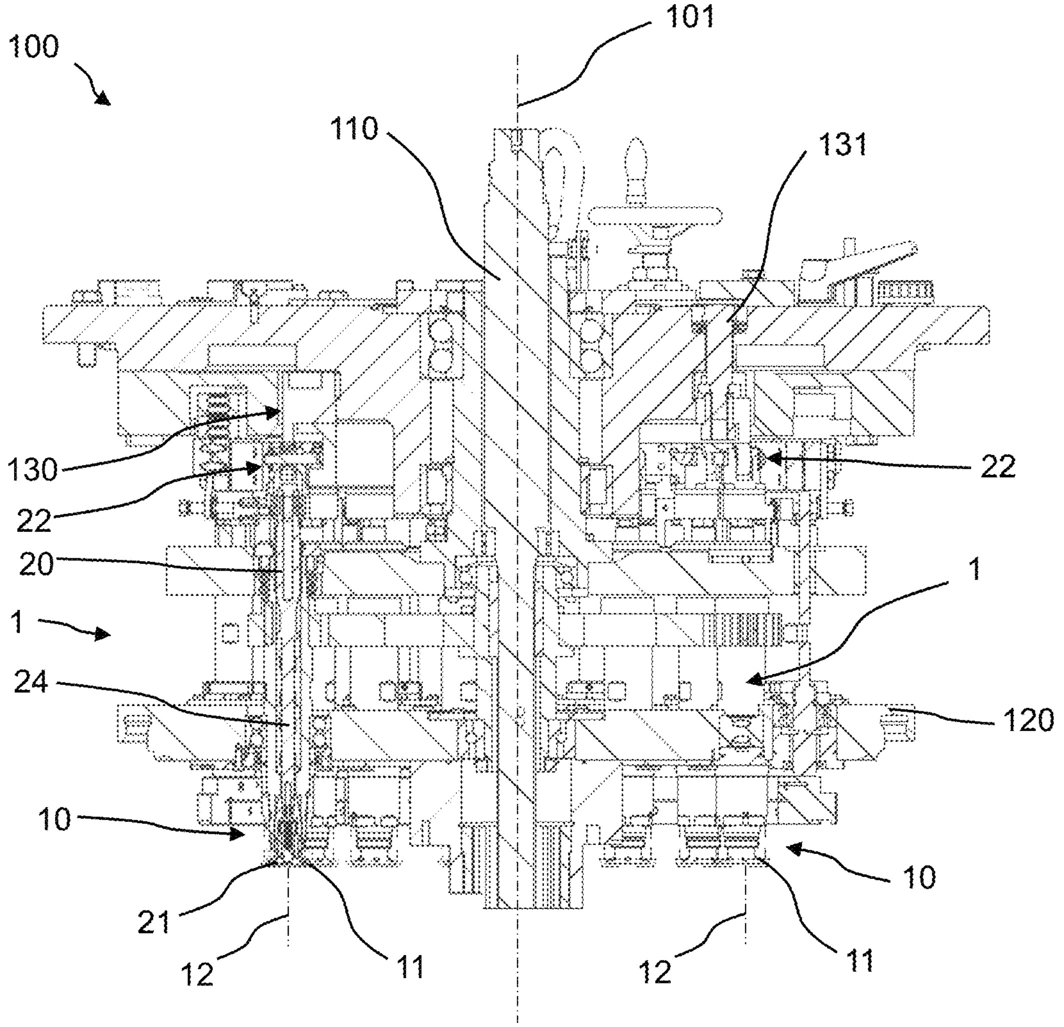
FIG. 1 shows a schematic sectional view through a closer for closing a can with a can lid.

FIG. 1 shows a schematic sectional view of a closer 100 for closing containers with a container closure, in the present case configured for closing cans filled with a beverage with a can lid, but not limited thereto. The closer 100 is intended as a component of a beverage filling plant.

The closer 100 comprises a frame 110 and a transport unit 120 that can be rotated about a central axis of rotation 101 about the frame 110. The closer 100 is thus configured as a rotary-type closer and the transport unit 120 is configured as a transport carousel. Alternatively, the closer 100 can also have a different structure.

The transport unit 110 comprises a plurality of apparatuses 1 arranged in an evenly distributed manner in the circumferential direction relative to the central axis of rotation 101 for applying a container closure to a container, here for applying a can lid to a can.

Each apparatus 1 comprises an application unit 10, which can also be referred to as a seaming head and which is oriented in the direction of a longitudinal axis 12, which is herein optionally oriented parallel to the axis of rotation 101, relative to the transport unit 120. The application unit 10 comprises a closure receptacle 11 for receiving a container closure, here a can lid. The closure receptacle 11 can thus be referred to as a can lid receptacle.

In order to close the can with the can lid, the application unit 10 cooperates with a can holder (not shown) assigned to the application unit 10, which constitutes an example of a container holder, and optionally with a flanging unit (not shown). The can holder is arranged below the application unit 10 with respect to the longitudinal axis 12. For applying the can lid to the unsealed can held in the can holder, the application unit 10 and the can holder are moved relative to each other and towards each other in the direction of the longitudinal axis 12. In the present case, this is achieved by configuring the can holder such that it can be moved in the direction of the longitudinal axis 12. Alternatively or additionally, the application unit 10 can also be configured such as to be movable in the direction of the longitudinal axis 12.

According to this exemplary embodiment, the application unit 10 and the can holder can rotate about the longitudinal axis 12, so that the optional flanging unit arranged on the transport unit 120 can perform a flanging of the edge of the can lid with a can opening of the can in order to connect the can lid to the can, more precisely to the can opening.

The apparatus 1 further comprises an ejector unit 20 which is movable relative to the application unit 10 for ejecting a container closure received in the closure receptacle 11.

An ejector part 21 is arranged on the ejector unit 20 on its side facing the closure receptacle 11 and is provided for ejecting a container closure located in the closure receptacle 11. When the container closure is ejected, the ejector part 21 comes into physical contact with the container closure. According to this non-limiting embodiment, the ejector part 21 has the shape of an ejector shield. Alternatively, it can also be configured as a central ejector, for example.

The closer 100 further comprises a fixed guide curve 130 for specifying the position of the ejector unit 20 relative to the closure receptacle 11. In the present case, in a non-limiting way, the ejector unit 20 comprises a guide roller 22 which rolls on the guide curve 130. The guide curve 130 is configured such that, in a predetermined first angle of rotation or angle of rotation range relative to the axis of rotation 101, the ejector part 21 is positioned at a distance from a container closure held in the intended position in the closure receptacle 11, or is positioned such as to act as an upper stop for the container closure. In this first angle of rotation or angle of rotation range, the container closure can be applied to the container to be closed. The guide curve 130 is further configured such that in a further angle of rotation or further angle of rotation section the ejector part 21 is moved downwards so as to eject a container closure remaining in the closure receptacle 11 from the closure receptacle 11.

The guide curve 130 is configured to be height-adjustable relative to the transport unit 120 in the direction of movement of the ejector unit 20, i.e., here in the direction of the longitudinal axis 12 or central axis of rotation 101. For this purpose, the guide curve 130 comprises a height adjustment apparatus 131, via which the height position of the guide curve 130 can be changed relative to the frame 110.

Figure 2:
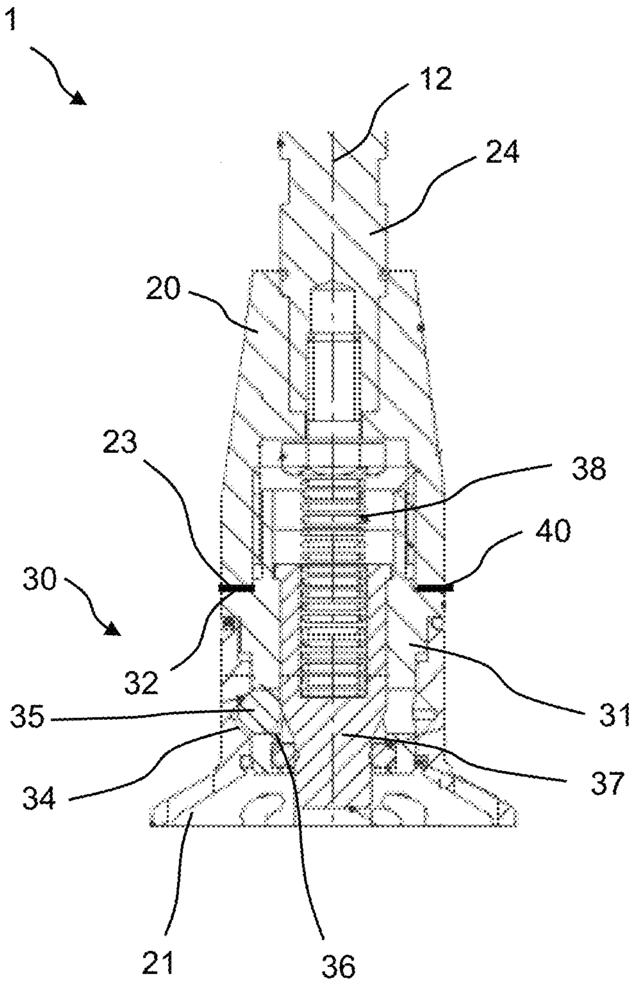
FIG. 2 shows a schematic detailed sectional view of an apparatus for applying a can lid to a can, as installed in a majority in the closer according to FIG. 1.

FIG. 2 schematically shows a sectional view through a partial region of the apparatus 1 of FIG. 1. It shows that the ejector part 21 is detachably attached to the ejector unit 20 via a quick-coupling mechanism 30.

The quick-coupling mechanism 30 comprises a coupling part 31 fastened to the ejector unit 20, to which the ejector part 21 is detachably coupled. Alternatively, the ejector unit 20 itself can form the coupling part.

A position of the coupling part 31 relative to the ejector unit 20, more precisely of an ejector rod 24 of the ejector unit 20, with respect to the longitudinal axis 12 is adjustable. According to this non-limiting embodiment, the position of the coupling part 31 can be adjusted by positioning a predetermined number of shims 40, which are configured here, for example, as washers, between the coupling part 31 and the ejector unit 20.

The ejector unit 20 and the coupling part 31 comprise correspondingly formed stop surfaces 23, 32, which are oriented transversely to a mounting direction in which the coupling part 31 is mounted to the ejector unit 20. Here, the mounting direction is oriented in the direction of the longitudinal axis 12. The intended number of shims 40 is arranged between the aforementioned stop surfaces 23, 32. The position of the coupling part 31 relative to the ejector unit 20, more precisely of the ejector rod 24 of the ejector unit 20, can be adjusted via the number of shims 40. The position can thus be changed by changing the number of shims 40.

As already described in the general part hereof, the predetermined number can range from zero to a plurality of shims 40. The number and thickness of the shims 40 are selected as required to position the coupling part 31 and thereby the ejector part 21 coupled to the ejector unit 20 via the coupling part 31 to the height position intended for the ejector part 21. FIG. 2 shows precisely one shim 40. However, this is only an example.

The ejector part 21 comprises a coupling groove 34 for receiving a plurality of detent bodies 35 which are received in detent body receptacle 36 of the coupling part 31 in a manner evenly distributed in the circumferential direction with respect to the longitudinal axis 12 and which are optionally configured here as detent balls.

An actuating part 37 is arranged on the coupling part 31 and is movable relative to the coupling part 31 between a detent position shown in FIG. 2 and a release position. In the detent position, the actuating part 37 fixes the detent bodies 35 in a detent position, in which each detent body 35 forms a positive connection between the ejector part 21 and the coupling part 31. In the release position, the detent bodies 35 can disengage from the ejector part 21, so that the ejector part 21 can be removed from the coupling part 31 and possibly replaced by another ejector part 21. For example, this allows a quick and easy retooling from using an ejector part of a first type to an ejector part of a different type. Alternatively, worn ejector parts 21 can be replaced easily and quickly.

The actuating part 37 is biased into the detent position by a bias part 38, here configured as a bias spring. By pressing the actuating part 37 in the direction of the longitudinal axis 12 against the direction of the bias provided by the bias part 38—namely upwards in the present case—i.e., in the direction of the ejector unit 20, a section of reduced diameter of the actuating part 37 reaches the level of the detent bodies 35, so that they can move radially inwards and the positive connection in the direction of the longitudinal axis 12 between the ejector part 21 and the detent body 35 can be canceled.

To the extent applicable, any of the individual features set forth in the exemplary embodiments may be combined and/or interchanged, without departing from the scope of the invention.

What is claimed is:

1. An apparatus for applying a container closure to a container comprising:

an application unit having a closure receptacle configured to receive the container closure;

an ejector unit movable relative to the application unit and configured to eject the container closure received in the closure receptacle; and an ejector part arranged on the ejector unit on its side facing the closure receptacle, configured to eject the container closure, and detachably attached to the ejector unit via a coupling mechanism, wherein when the container closure is ejected, the ejector part physically contacts the container closure.

2. The apparatus of claim 1, wherein the ejector part comprises an ejector shield.

3. The apparatus of claim 1, wherein the coupling mechanism comprises a coupling part fastened to the ejector unit to which the ejector part is detachably coupled.

4. The apparatus of claim 3, wherein the ejector unit forms the coupling part.

5. The apparatus of claim 3, wherein a position of the coupling part relative to the ejector unit is adjustable between the coupling part and the ejector unit.

6. The apparatus of claim 5, wherein the position of the coupling part is adjustable due to positioning of a predetermined number of shims between the coupling part and the ejector unit.

7. The apparatus of claim 3, wherein the ejector unit and the coupling part comprise correspondingly formed stop surfaces that are oriented transversely to a mounting direction in which the coupling part is mounted to the ejector unit.

8. The apparatus of claim 3, wherein the ejector part comprises a coupling groove configured to receive at least one detent body.

9. The apparatus of claim 8, wherein the at least one detent body comprises a detent ball.

10. The apparatus of claim 3, wherein the coupling part comprises at least one detent body receptacle configured to receive at least one detent body.

11. The apparatus of claim 3, further comprising an actuating part that is movable relative to the ejector part and arranged on the ejector part.

12. The apparatus of claim 3, further comprising an actuating part that is arranged on the coupling part and is movable relative to the coupling part between a detent position and a release position, wherein, in the detent position, the actuating part fixes at least one detent body in a detent position where the at least one detect body forms a positive connection between the ejector part and the coupling part, and in the release position, the at least one detent body is disengageable from the ejector part or the coupling part.

13. The apparatus of claim 12, wherein the actuating part is biased into the detent position by a bias part.

14. The apparatus of claim 13, wherein the bias part comprises a bias spring.

15. A closer for closing containers with a container closure comprising:

a container holder configured to hold an unsealed and filled container; and an apparatus for applying the container closure to a container comprising:

an application unit having a closure receptacle configured to receive the container closure;

an ejector unit movable relative to the application unit and configured to eject the container closure received in the closure receptacle; and an ejector part arranged on the ejector unit on its side facing the closure receptacle, configured to eject the container closure, and detachably attached to the ejector unit via a coupling mechanism, wherein when the container closure is ejected, the ejector part physically contacts the container closure.

16. The closer of claim 15, wherein the apparatus is arranged on a transport unit that is movable in a transport direction.

17. The closer of claim 16, wherein the closer is configured as a rotary-type closer and the transport unit is configured as a transport carousel.

18. The closer of claim 15, further comprising a fixed guide curve configured to specify a position of the ejector unit relative to the closure receptacle.

19. The closer of claim 18, wherein the ejector unit comprises a guide roller configured to roll on the fixed guide curve.

20. The closer of claim 18, wherein the fixed guide curve is configured to be height-adjustable in a direction of movement of the ejector unit.

* * * * *